United States Patent
Oura

[11] Patent Number: 5,991,614
[45] Date of Patent: Nov. 23, 1999

[54] UTILIZATION MANAGEMENT SYSTEM OF PORTABLE TELEPHONE

[75] Inventor: Hideto Oura, Tokyo, Japan

[73] Assignee: Oki Electric Industry Co., Ltd., Tokyo, Japan

[21] Appl. No.: 08/985,188

[22] Filed: Dec. 4, 1997

[30] Foreign Application Priority Data

May 30, 1997 [JP] Japan .................................. 9-157911

[51] Int. Cl.⁶ .................................................. H04B 10/08
[52] U.S. Cl. ............................................. 455/404; 455/88
[58] Field of Search ................................ 455/404, 410, 455/411, 134, 456; 340/539; 342/457

[56] References Cited

U.S. PATENT DOCUMENTS

| | | | |
|---|---|---|---|
| 4,560,978 | 12/1985 | Lemelson | 340/539 |
| 4,965,548 | 10/1990 | Fayfield | 455/134 |
| 5,119,018 | 6/1992 | Katayama et al. | 324/76.27 |
| 5,235,633 | 8/1993 | Dennison et al. | 455/456 |
| 5,442,805 | 8/1995 | Sagers et al. | 455/456 |
| 5,543,779 | 8/1996 | Aspesi et al. | 340/539 |

*Primary Examiner*—Wellington Chin
*Assistant Examiner*—Blane J. Jackson
*Attorney, Agent, or Firm*—Venable; Robert J. Frank; James R. Burdett

[57] ABSTRACT

The shielded area 3 which is shielded from radio waves is provided at the entrance to the protected area 1, for example, installed with medical equipment. The transmitter 6 in the shielded area 3 transmits the control signal 11 to the portable telephone 5, which returns the response signal 12 in response to the control signal 11. The receiver 7 receives the response signal 12 to notify the alarm 8 that the portable telephone 5 in operation. Thus, the alarm indicative of turning off the portable telephone 5 urges the holder 2 thereof not to carry the portable telephone 5 into the protected area 1.

4 Claims, 4 Drawing Sheets

UTILIZATION MANAGEMENT SYSTEM OF PORTABLE TELEPHONE

BACKGROUND OF THE INVENTION

The present invention relates to a utilization management system of portable telephone which raises an alarm requesting a person who brings a portable telephone into a forbidden area of potable telephone, to turn off the portable telephone.

The portable telephones have been commonly used as one of the principal communication means during moving. The portable telephones, however, appear to harmfully affect various electronic apparatus due to radiation of rather strong microwave. To avoid such a harm, some areas such as airplane, hospital, and public place installed with electronic equipment, are provided with devices for raising the alarm using a loudspeaker and a notice.

Incidentally, if the holders of the portable telephones bring the portable telephones into a forbidden area with the portable telephone turned on, the loudspeaker and the notice, which are capable of urging the holders not to use the portable telephones, cannot prevent the holders from receiving a call originated by a telephone subscriber outside. Among detecting methods of holding the portable telephones in the forbidden areas, there has been available a method of detecting transmission radio wave radiated from a portable telephone which originates a call. However, the method, which is able to give an alarm through detecting the transmission radio wave emitted from the portable telephone, cannot avoid occurrence of failure in the electronic equipment; that is to say, the electronic equipment have been already affected with the transmission radio wave. Alternatively, there has been used a method of detecting a leakage radio wave radiated from the portable telephone during waiting. However, to meet regulations relevant to leakage radio wave, the portable telephones are generally shielded with tight covering, namely, does not leak radio wave outwards, or allows few radio wave to leak outside. Therefore, the conventional method could not detect leakage radio wave from the portable telephones.

SUMMARY OF THE INVENTION

It is therefore the object of the present invention to provide a utilization management system of portable telephone which is capable of preventing carrying the portable telephone into the protected area.

According to one aspect of the present invention, the utilization management system of portable telephone comprises a shielded area shielded from electromagnetic wave, provided at an entrance of a protected area inhibiting use of the portable telephone; a transmitter, provided in the shielded area, transmitting a given control signal requesting the portable telephone for a response signal; a receiver receiving the response from the portable telephone; and an alarm unit raising an alarm to a holder of the portable telephone in response to the response signal.

In the utilization management system of portable telephone according to another aspect of the present invention, the transmitter transmits to the portable telephone the control signal indicating an entry into a management area different from an external of the shielded area in the shielded area; the receiver receives a position registration call that the portable telephone originates in response to the control signal upon entering the different management area; and the alarm unit raises the alarm to the holder of the portable telephone upon receipt of the position registration call therefrom.

According to further another aspect of the present invention, the utilization management system of portable telephone comprises a shielded area shielded from electromagnetic wave, provided at an entrance of a protected area inhibiting use of the portable telephone; a transmitter transmitting a given control signal to the portable telephone in the shielded area; and a power supply cutoff circuit, provided in the portable telephone, cutting off a power supply for operation of the portable telephone in response to the control signal.

According to further another aspect of the present invention, the utilization management system of portable telephone comprises a shielded area shielded from electromagnetic wave, provided at an entrance of a protected area inhibiting use of the portable telephone; a transmitter transmitting a given control signal to the portable telephone in the shielded area; and a transmission inhibit circuit, provided in the portable telephone, inhibiting transmission of the portable telephone upon receipt of the control signal.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 1(*b*) is a schematic diagram showing the utilization management system of portable telephone according to the present invention;

DESCRIPTION OF THE PREFERRED EMBODIMENT(S)

Hereinafter, the preferred embodiment of the utilization management system of portable telephone will be now described in detail with reference to the accompanying drawings.

Figure 1A:
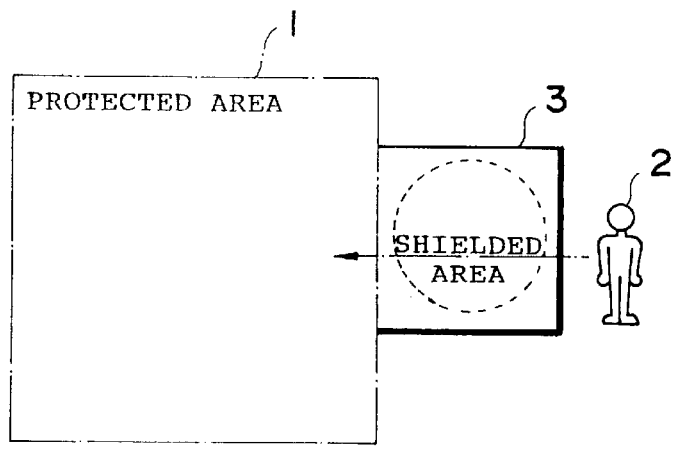
FIG. 1(*a*) is a diagram showing a shielded area installed with the utilization management system of portable telephone according to the present invention.
Figure 1B:
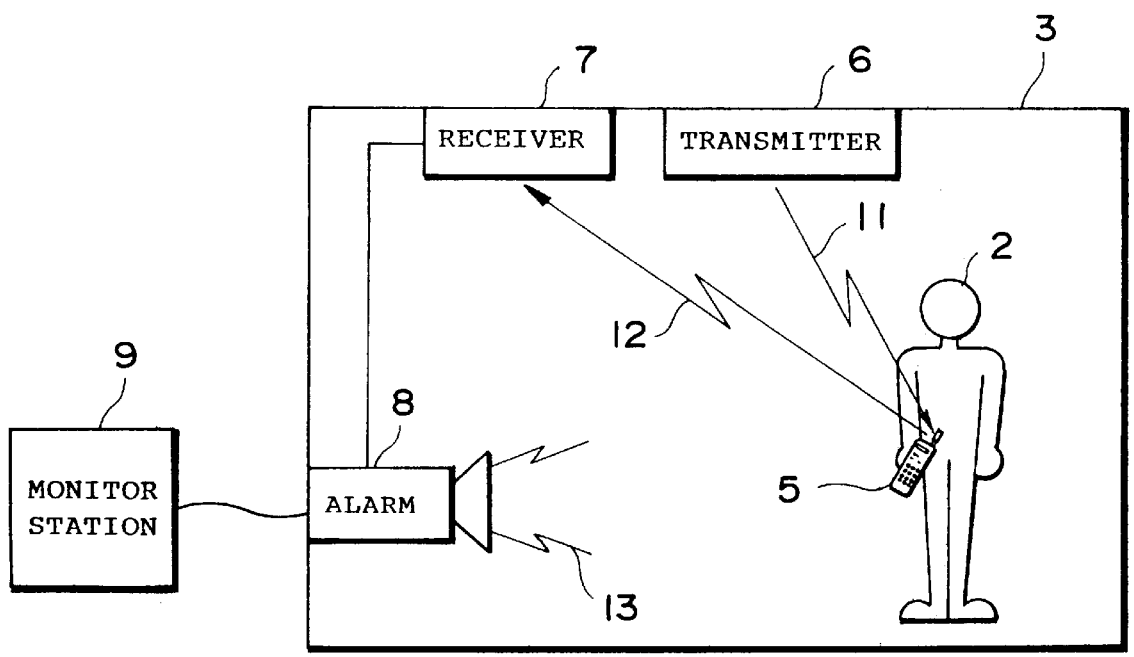

FIG. 1(*a*) is a block diagram illustrating a shielded area installed with the utilization management system of portable telephone according to the preferred embodiment of the present invention, and FIG. 1(*b*) is a schematic diagram showing the utilization management system of portable telephone. In FIG. 1(*a*), the protected area 1 is a room provided with a medical precision instrument in hospital, for example. The portable telephone, if brought to originate a call or receive a call using radio wave in or near the room, possibly causes malfunction of electronic instrument such as medical precision instrument. In order to avoid such a malfunction, the utilization management system of portable telephone prevents carrying the portable telephone into the protected area 1 with its switch turned on.

In front of the protected area 1, there are provided with a given entrance path where every person including the holder 2 of the portable telephone 5 must pass, and the shielded area 3 is given thereat. The shielded area 3 is constructed so as to be shielded from external radio wave and so as not to leak internal radio wave outwards. Any conventional shielding methods are available for the shielded area 3. In this way, no transmission radio wave, namely, an origination call can reach the portable telephone 5 from a base station (not shown), while no transmission radio wave can leak outwards from the portable telephone 5. Furthermore, in the shielded area 3 are provided the transmitter 6 and receiver 7 and in the vicinity of them is provided the alarm 8.

The transmitter 6 transmits a control signal 11 including the specific contents as described later, at the same frequency as that of the base station of the portable telephone. The receiver 7 receives a response signal 12 originated from the portable telephone 5 in response to the control signal 11. The alarm 8 gives an alarm 13 to the holder 2 of the portable telephone 5 when the receiver 7 receives the response signal 12. The alarm 13 involves an announcement "turn off your portable telephone" in voice, for example. Alternatively, a variety of alarm notification apparatus such as an electric bulletin board are available for attracting the attention of the holder 2 to bringing the portable telephone 5 inside. Furthermore, the alarm 8 is composed so as to notify the monitor station 9 of the detection of the portable telephone 5. In the monitor station 9, the supervisor (not shown) can take suitable measure in response to the notification.

As described above, the utilization management system of portable telephone according to the present invention detects the portable telephone in waiting, with its switch turned on due to unawareness of the holder 2 of the portable telephone 5. In addition, the system detects it in the shielded area 3 in which there is laid no radio wave but the radio wave of the portable telephone 5, which does not bring out any harmful affection to the electronic equipment installed in the protected area 1. To carry out the detection, the transmitter 6 sends the control signal 11 to the portable telephone 5 while the receiver 7 receives the response signal 12 therefrom.

The portable telephone may employ different control systems. Herein, the digital cellular system (PDC system), which is commonly used in Japan, will be described as an example.

Figure 2:
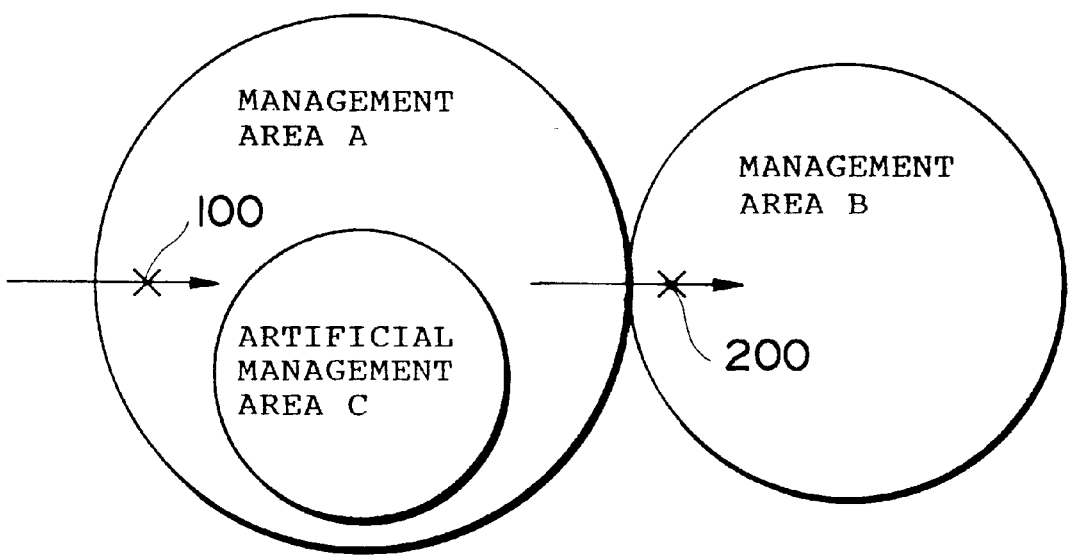
FIG. 2 is an explanatory diagram of the position registration call of the portable telephone.

FIG. 2 is a diagram explaining a position registration call originated by the portable telephone. To reduce power consumption of waiting in order to wait for a longer period of time, the portable telephone during waiting implements only the receipt of the radio wave of a call from the base station. The base station notifies the portable telephone of which of management areas the portable telephone is laid in, and also performs the control for calling the portable telephone. The receiving device in the portable telephone (not shown) is always waiting for the notification, but the transmitting device in the portable telephone (not shown) does not work until the portable telephone crosses the boundary between the current management area and the neighboring management area. However, upon receiving a radio wave from another base station different from the base station in the current management area, the portable telephone starts the operation of the position registration call, more specifically, the transmission of the information relevant to the portable telephone in order to register the position thereof in the new base station, which is executed pursuant to the protocol regulated in RCR STD-27.

As shown in FIG. 2, when entering the management area A controlled by a base station, the portable telephone implements the position registration call of transmitting information on the portable telephone to the base station, which is made at the point 100. Similarly, when passing through the management area A to move into the management area B, the portable telephone executes the position registration call, which is made at the point 200. In accordance with this invention, the shielded area 3 in FIG. 1 is constructed similarly to the artificial management area C. More specifically, when the portable telephone 5 moving in the management area A enters the shielded area 3, the transmitter 6 transmits to the portable telephone 5 a signal which urges the portable telephone 5 to perform the position registration call. In short, the artificial management area C constituted like the shielded area 3 forces the portable telephone 5 going through the shielded area 3 to execute the position registration call.

The transmitter 6 transmits the control signal 11 using a radio wave, wherein the control signal 11 has the same frequency but different contents as compared with the base station; the portable telephone 5 transmits the response signal 12 for the position registration call in response to the control signal 11. Since the control signal 11 is used only for urging at least one transmission of the response signal 12, the whole procedure of the position registration call may be incomplete; the portable telephone 5 will be able to execute the true position registration call when the holder 2 goes out of the shielded area 3 into an area which enables the portable telephone 5 to work as usual. The receiver 7 need to detect the response signal 12 sent by the portable telephone 5 using a radio wave with a given frequency, but do not need to appreciate the contents of the response signal 12.

Figure 3:
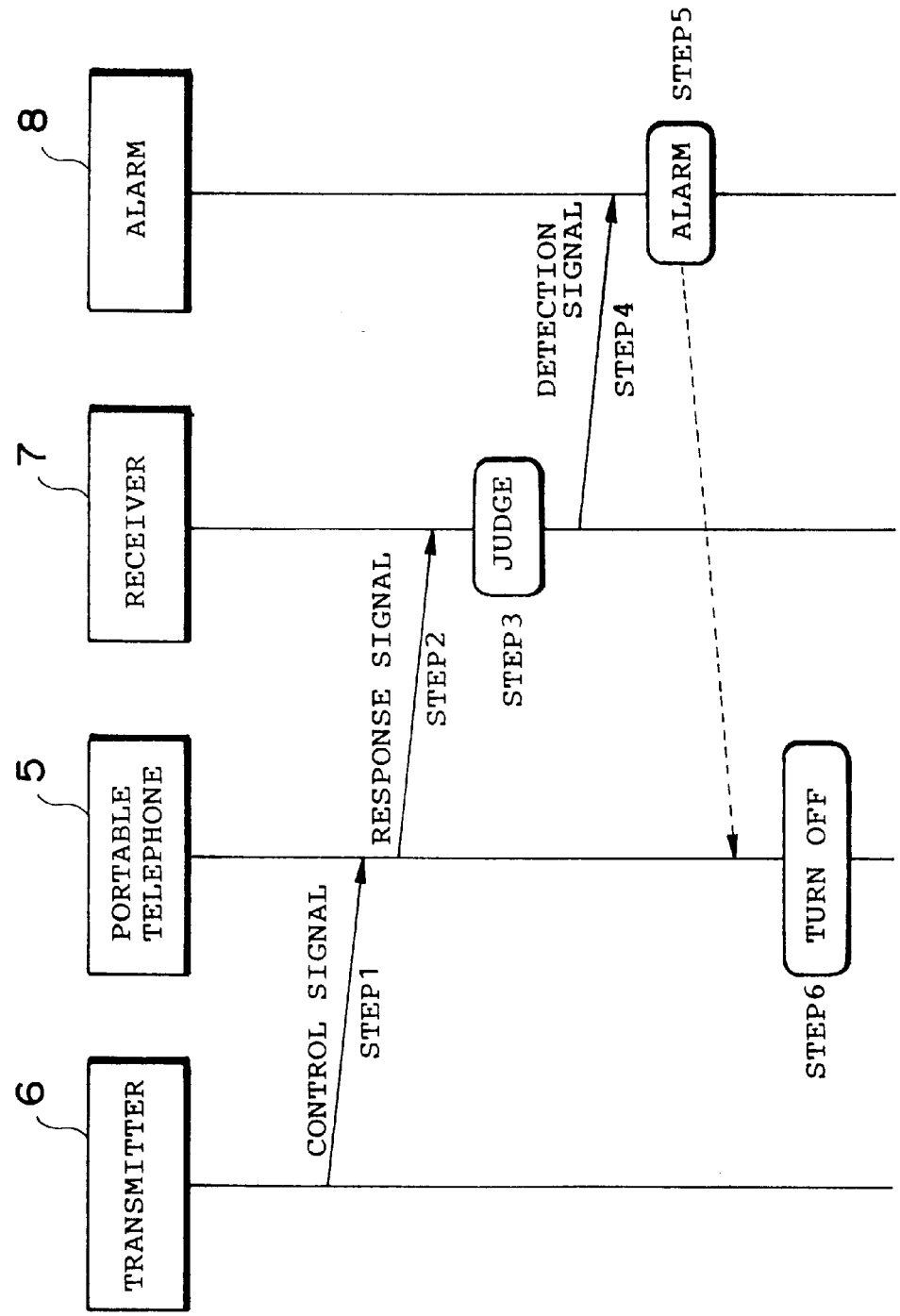
FIG. 3 is an explanatory diagram of the operation of the utilization management system of portable telephone according to the present invention.

FIG. 3 is a diagram showing the operation of the utilization management system of portable telephone, in which the operation sequential operation thereof is illustrated. At step 1, the transmitter 6 sends the control signal 11 to the portable telephone 5, and the portable telephone 5 sends the response signal 12 in response to the control signal 11 at step 2. Subsequently, the receiver 7 receives the response signal 12, which judges whether the response signal 12 is originated by the portable telephone 5 or not, at step 3. If judging that the response signal 12 is sent from the portable telephone 5, the receiver 7 notifies the alarm 8 of the detection signal denoting the detection of the portable telephone 5, at step 4. At step 5, the alarm 8 raises the alarm 13 according to the detection signal. For example, the alarm 8 gives the alarm 13 once the holder 2 of the portable telephone 5 passes a specific point, whereby the holder 2 directs his/her attention to the portable telephone 5, thus turning it off at step 6. Simultaneously, the supervisor in the monitor station 9 may notify the holder 2 of the instruction of turning off the portable telephone 5, if necessary.

The above utilization management system of the portable telephone detects the portable telephone by employing the position registration call thereof. In addition, the following functions in the portable telephone serves to automatically turn off the portable telephone and halt transmission of the radio wave therefrom.

Figure 4:
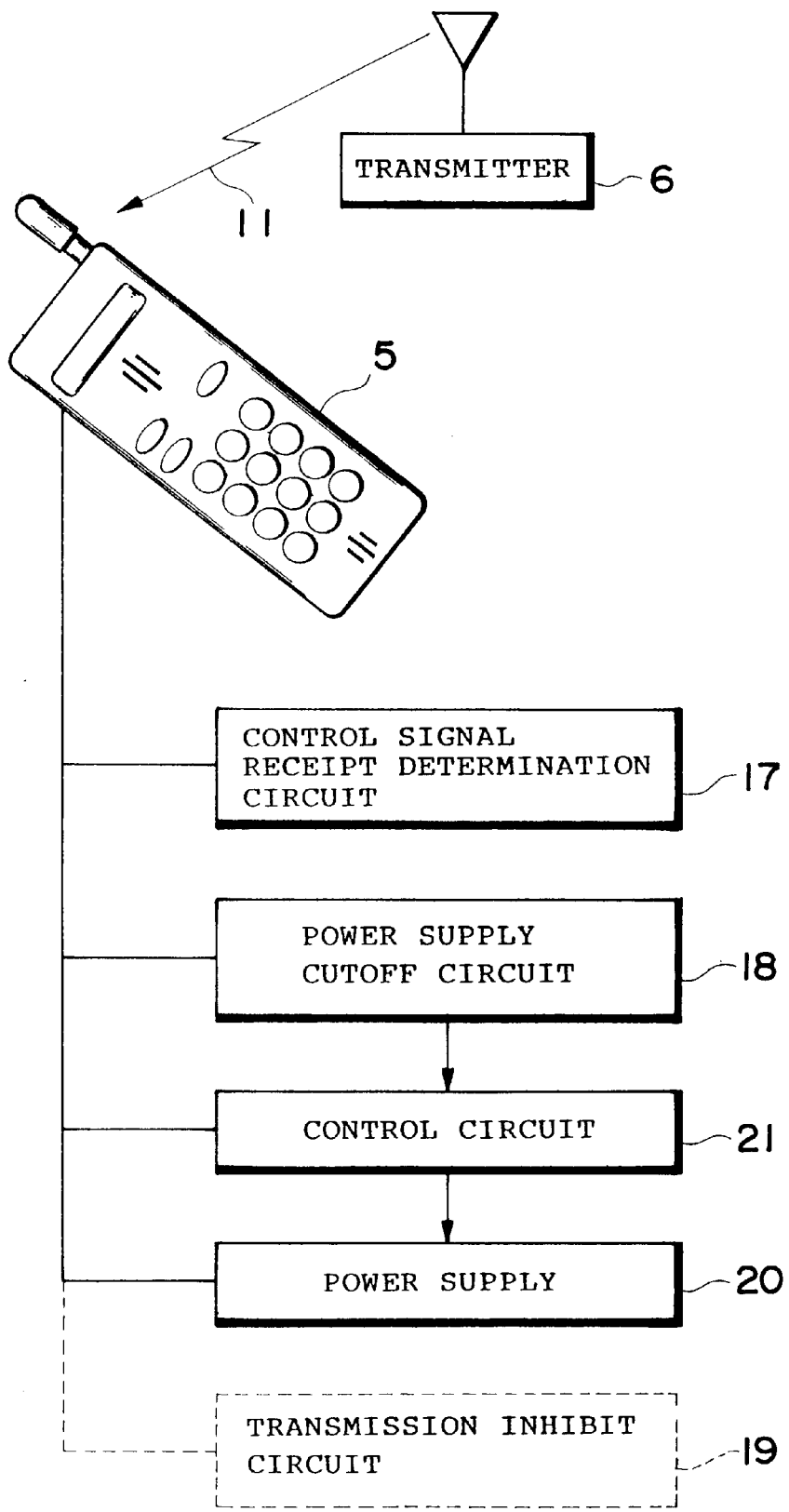
FIG. 4 is a block diagram of a modified utilization management system of portable telephone according to the present invention.

FIG. 4 is a block diagram showing another preferred embodiment of the utilization management system of portable telephone according to the present invention. The portable telephone 5 includes the control signal receipt determination circuit 17, and the power supply cutoff circuit 18. The portable telephone 5 may have the transmission inhibit circuit 19 in addition to the power supply cutoff circuit 18, or in lieu thereof.

Herein, assuming that the transmitter 6 sends the control signal 11 serving to turn off the portable telephone 5.

Referring to FIG. 2, in general, base stations such as the base stations managing the management area A and the management area B, broadcast to portable telephones signals denoting where the portable telephones are laid, more exactly, the fact that the portable telephones are laid within one of the areas managed by the base stations. In case of this system, the instruction to turn off the portable telephone 5 is involved in the broadcasted signal. More definitely, the instruction is assigned to vacant bits or empty bits of the broadcasted signal.

The shielded area 3 is constructed in such a fashion that the portable telephone 5 turns off the power supply 20 in response to the control signal 11, like the above broadcasted signal including the instruction to turn off the portable telephone, transmitted by the transmitter 6. The control signal receipt determination circuit 17 determines whether or not the control signal includes the instruction to turn off the power supply 20. For this purpose, the control signal receipt determination circuit 17 judges the effectiveness of the assigned bits. Furthermore, the power supply cutoff circuit 18, which is connected to the control circuit 21 that controls the switch of the power supply 20 of the portable telephone 5, is composed so as to be activated when the control signal receipt determination circuit 17 receives the signal which instructs turning off the power supply 20. In this way, the portable telephone 5 is obligatorily turned off when the holder 2 passes the shielded area 3 with the portable telephone 5 turned on. Alternatively, use of the transmission inhibit circuit 19 in place of the power supply cutoff circuit 18 can inhibit the portable telephone 5 from responding to a call from external. The transmission inhibit circuit 19 forbids all the transmission functions, but allows only the receipt functions, which is constructed so as to halt the transmission functions in response to the output of the control signal receipt determination circuit 17.

In addition, by resetting these circuits afterwards, the portable telephone 5 returns to the ordinary operation, whereby the holder 2 can use it as usual. That is, in addition to employing the position registration call procedure of the portable telephone, employing such a control allows the detection of the potable telephone and the obligatory halt of the operation thereof.

As described above, in the utilization management system of portable telephone according to the present invention, the shielded area, which is shielded from radio waves, is provided at the entrance to the protected area; the transmitter in the shielded area sends the control signal to the portable telephone, receiver therein the receives the response signal from the portable telephone, and the alarm raises the alarm indicative of turning off to the holder of the portable telephone in response to the response signal. This prevents the portable telephone from being carried into the protected area with the power supply turned on. Furthermore, to detect the portable telephone, applying the position registration call allows the obligatory activation of the portable telephone. Moreover, transmitting to the portable telephone the control signal which instructs cutoff of the power supply can halt the whole operations of the portable telephone completely.

What is claimed is:

1. A utilization management system of portable telephone comprising:

a shielded area shielded from electromagnetic wave, provided at an entrance of a protected area inhibiting use of the portable telephone;

a transmitter, provided in the shielded area, transmitting a given control signal requesting the portable telephone for a response signal;

a receiver receiving the response from the portable telephone; and an alarm unit raising an alarm to a holder of the portable telephone in response to the response signal.

2. A utilization management system of portable telephone as set forth in claim 1, wherein the transmitter transmits to the portable telephone the control signal indicating an entry into a management area different from an external of the shielded area in the shielded area;

the receiver receives a position registration call that the portable telephone originates in response to the control signal upon entering the different management area; and the alarm unit raises the alarm to the holder of the portable telephone upon receipt of the position registration call therefrom.

3. A utilization management system of portable telephone comprising:

a shielded area shielded from electromagnetic wave, provided at an entrance of a protected area inhibiting use of the portable telephone;

a transmitter transmitting a given control signal to the portable telephone in the shielded area; and a power supply cutoff circuit, provided in the portable telephone, cutting off a power supply for operation of the portable telephone in response to the control signal.

4. A utilization management system of portable telephone comprising:

a shielded area shielded from electromagnetic wave, provided at an entrance of a protected area inhibiting use of the portable telephone;

a transmitter transmitting a given control signal to the portable telephone in the shielded area; and a transmission inhibit circuit, provided in the portable telephone, inhibiting transmission of the portable telephone upon receipt of the control signal.

* * * * *